US009697609B2

(12) United States Patent
Kim et al.

(10) Patent No.: US 9,697,609 B2
(45) Date of Patent: Jul. 4, 2017

(54) METHOD AND APPARATUS FOR ESTIMATING POSE

(71) Applicant: SAMSUNG ELECTRONICS CO., LTD., Suwon-si (KR)

(72) Inventors: Won Jun Kim, Hwaseong-si (KR); Byung In Yoo, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 14/289,915

(22) Filed: May 29, 2014

(65) Prior Publication Data
US 2014/0355825 A1 Dec. 4, 2014

(30) Foreign Application Priority Data
Jun. 3, 2013 (KR) ........................ 10-2013-0063574

(51) Int. Cl.
*G06K 9/00* (2006.01)
*G06T 7/00* (2017.01)
*G06T 7/73* (2017.01)

(52) U.S. Cl.
CPC ........ *G06T 7/0046* (2013.01); *G06K 9/00342* (2013.01); *G06K 9/00369* (2013.01); *G06T 7/75* (2017.01); *G06T 2207/10016* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 8,023,726 | B2 * | 9/2011 | Sundaresan | G06K 9/00342 345/604 |
| 8,213,680 | B2 | 7/2012 | Fitzgibbon et al. | |
| 8,325,984 | B2 | 12/2012 | Lee et al. | |
| 8,351,656 | B2 * | 1/2013 | Spicola | A01K 29/00 356/4.03 |
| 8,565,479 | B2 * | 10/2013 | Gurman | G06K 9/00201 382/103 |
| 8,724,906 | B2 * | 5/2014 | Shotton | G06T 7/0046 382/209 |
| 8,805,024 | B2 * | 8/2014 | Joo | G06T 7/251 382/103 |
| 9,087,379 | B2 * | 7/2015 | Wang | G06T 7/2046 |
| 9,171,380 | B2 * | 10/2015 | Lee | H04N 5/23219 |
| 9,189,886 | B2 * | 11/2015 | Black | G06K 9/00369 |
| 2009/0175540 | A1 | 7/2009 | Dariush et al. | |
| 2010/0197399 | A1 | 8/2010 | Geiss | |

(Continued)

OTHER PUBLICATIONS

Ye et al., "Accurate 3D Pose Estimation From a Single Depth Image", 2011 IEEE International Conference on Computer Vision.*

(Continued)

*Primary Examiner* — Soo Park
(74) *Attorney, Agent, or Firm* — NSIP Law

(57) ABSTRACT

A method and apparatus for estimating a pose that estimates a pose of a user using a depth image is provided, the method including, recognizing a pose of a user from a depth image, and tracking the pose of the user using a user model exclusively of one another to enhance precision of estimating the pose.

26 Claims, 12 Drawing Sheets

(56) References Cited

U.S. PATENT DOCUMENTS

| | | | |
|---|---|---|---|
| 2011/0058709 A1* | 3/2011 | Kipman | A63F 13/10 |
| | | | 382/103 |
| 2011/0205337 A1 | 8/2011 | Ganapathi et al. | |
| 2012/0070070 A1* | 3/2012 | Litvak | G06K 9/00201 |
| | | | 382/154 |
| 2014/0072175 A1* | 3/2014 | Hasler | G06K 9/00536 |
| | | | 382/103 |
| 2014/0267611 A1* | 9/2014 | Kennett | G06K 9/00335 |
| | | | 348/46 |

OTHER PUBLICATIONS

Baak et al., "A data-driven approach for real-time full body pose reconstruction from a depth camera", 2011 IEEE International Conference on Computer Vision.*

Andreas Baak et al., "A Data-Driven Approach for Real-Time Full Body Pose Reconstruction from a Depth Camera", Saarland University & MPI Informatik (8 pages), 2011.

Jamie Shotton et al., "Real-Time Human Pose Recognition in Parts from Single Depth Images", Microsoft Research Cambridge & Xbox Incubation (8 pages), Jan. 2013.

Youding Zhu et al., "A Bayesian Framework for Human Body Pose Tracking from Depth Image Sequences", Honda Research Institute (14 pages), 2010.

* cited by examiner

FIG. 8
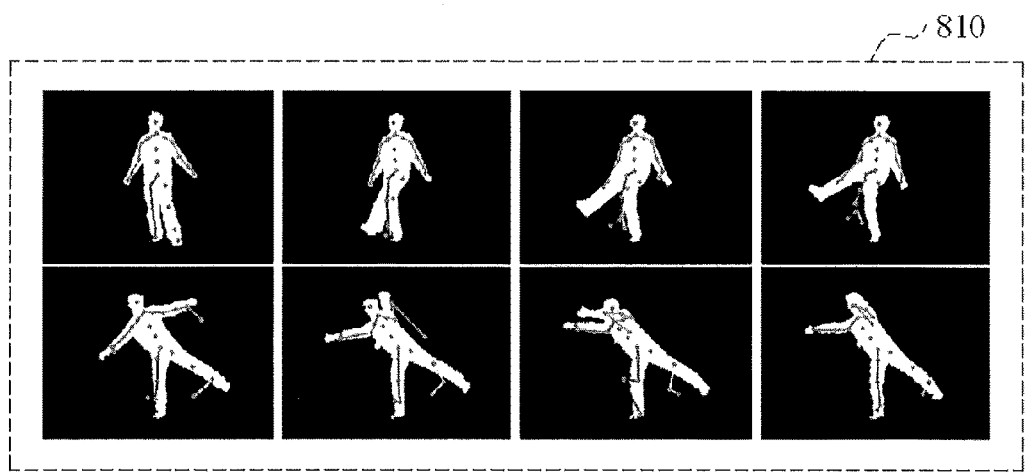
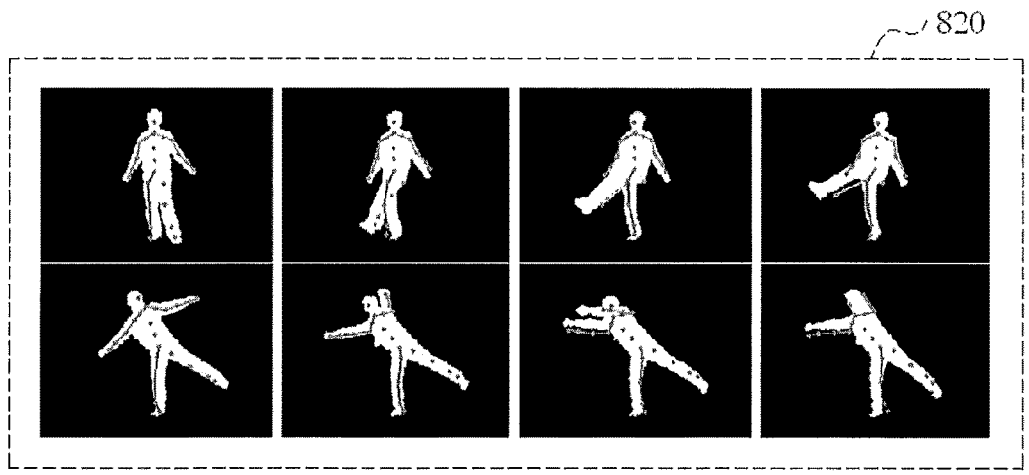

METHOD AND APPARATUS FOR ESTIMATING POSE

CROSS-REFERENCE TO RELATED APPLICATIONS

This application claims the priority benefit of Korean Patent Application No. 10-2013-0063574, filed on Jun. 3, 2013, in the Korean Intellectual Property Office, the disclosure of which is incorporated herein by reference.

BACKGROUND

1. Field

Example embodiments relate to a method and apparatus for estimating a pose that estimates a pose of a user from a depth image 2. Description of the Related Art In recent times, with developments in motion recognition based-interface technology, an interface based on motion recognition is in use in a variety of fields, for example, a smart television (TV), a game player, a smart phone, a healthcare device, and the like, based on a motion recognition.

A camera, a marker, a sensor, and the like, may be utilized to recognize a motion of a user. A method for recognizing a motion using a camera may apply an algorithm for extracting a shape of the user to an image captured by the camera, compare a result of applying the algorithm to predetermined data, and recognize a motion most similar to the motion of the user as a current motion of the user. A method for recognizing a motion using a marker or a sensor may identify a spatial position of the marker or the sensor to recognize a motion of a user when the user actually wears the marker or the sensor, and assumes a pose.

SUMMARY

The foregoing and/or other aspects are achieved by providing a method for estimating a pose, the method including recognizing a pose of a user from a depth image, estimating a pose of a user based on a result of the recognition, and recognizing a pose of a user from a subsequent depth image when a confidence of the result of the recognition satisfies a predetermined condition, tracking a pose of a user, using a user model when the confidence of the result of the recognition fails to satisfy a predetermined condition, and estimating a pose of a user based on a result of the tracking, and tracking a pose of a user with respect to a subsequent depth image, using the user model when the confidence of the result of the tracking satisfies a predetermined condition.

The method for estimating the pose may further include estimating a pose of a user based on at least one of the result of the recognition and the result of the tracking when the confidence of the result of the tracking fails to satisfy a predetermined condition.

The method for estimating the pose may further include generating a user model corresponding to a user, based on a user area displayed in the depth image and the result of the recognition.

The method for estimating the pose may further include selecting a user model corresponding to the user from among a plurality of predetermined user models, based on a similarity between a user area displayed in the depth image and the plurality of predetermined user models.

The foregoing and/or other aspects are achieved by providing a method for estimating a pose, the method including recognizing a pose of a user from a depth image, using a classification tree, tracking a pose of a user, based on a result of the recognition and a user model, and estimating a pose of a user, based on a result of the tracking.

The foregoing and/or other aspects are achieved by providing an apparatus for estimating a pose, the apparatus including a recognition unit to recognize a pose of a user from a depth image, a tracking unit to track a pose of a user, using a user model, and an estimation unit to estimate a pose of a user, using at least one of a result of the recognition of the recognition unit and a result of the tracking of the tracking unit.

The foregoing and/or other aspects are achieved by providing a hybrid pose recognition and tracking method that includes recognizing a pose of a user from a depth image, estimating the pose of the user, based on a result of the recognizing, and recognizing the pose of the user from a subsequent depth image when a confidence of a result of the recognizing satisfies a predetermined condition while otherwise tracking the pose of the user in the subsequent depth image using a user model selected from a plurality of predetermined user models.

The foregoing and/or other aspects are achieved by providing a hybrid pose recognition and tracking method that includes recognizing a pose of a user from a depth image, estimating the pose of the user, based on a result of the recognizing, and tracking the pose of the user in a subsequent depth image using a user model selected from a plurality of predetermined user models when a confidence of a result of the recognizing of the pose of the user fails to satisfy a predetermined condition.

The foregoing and/or other aspects are achieved by providing a hybrid pose recognition and tracking method that includes recognizing a pose of a user from a depth image, recognizing the pose of the user from a first subsequent depth image when a confidence of a result of the recognizing satisfies a predetermined condition, tracking the pose of the user in the subsequent depth image using a user model selected from a plurality of predetermined user models when the confidence of the result of the recognizing fails to satisfy the predetermined condition, and re-performing the recognizing the pose of the user from a second subsequent depth image when a confidence result of the tracking of the pose of the user in the subsequent depth image fails to satisfy a second predetermined condition.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 8 illustrates a result of recognizing a pose of a user using a classification tree, and a result of tracking a pose of a user using a user model according to example embodiments;

DETAILED DESCRIPTION

Figure 1:
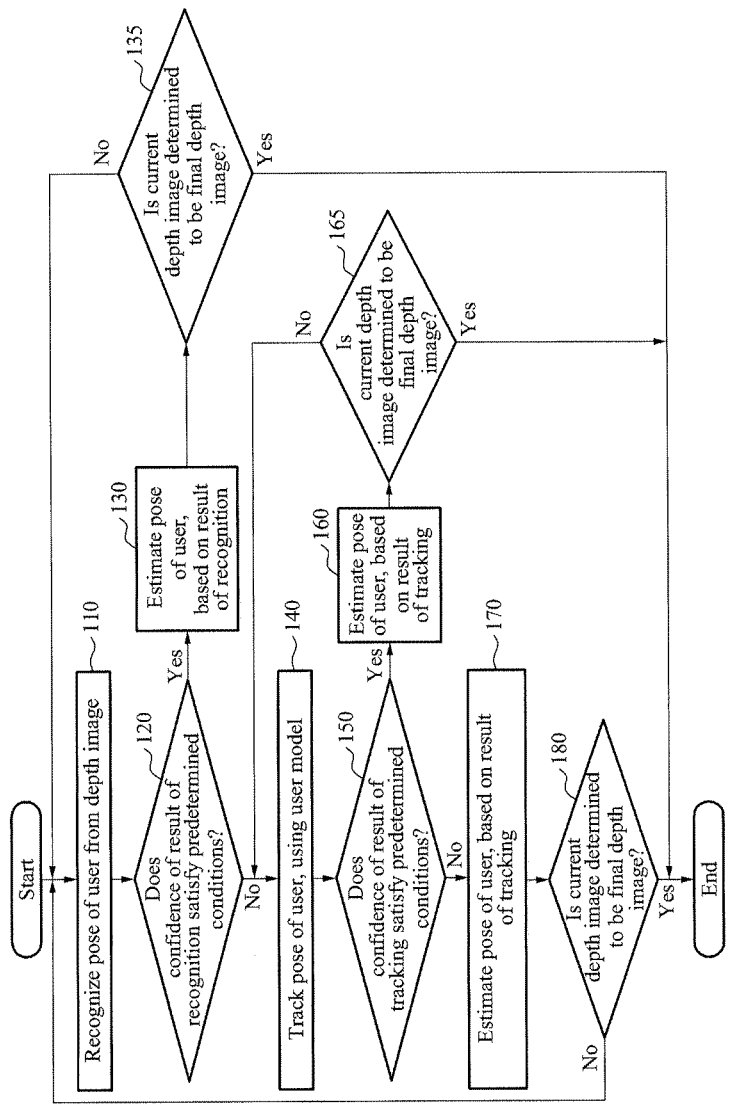
FIG. 1 illustrates a method for estimating a pose according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates a method for estimating a pose according to example embodiments.

An apparatus for estimating a pose may estimate a pose of a user displayed in a depth image. For example, the apparatus for estimating the pose may be provided with a depth image in which the user is photographed from a depth camera or a depth sensor for generating a depth image. The apparatus for estimating the pose may estimate a pose of the user in an image frame unit with respect to a depth image.

The apparatus for estimating the pose may perform a process of recognizing a pose based on a voxel reconstruction with respect to a user area displayed in a depth image input. When a confidence of a result of the recognizing of the pose fails to satisfy predetermined conditions, the apparatus for estimating the pose may perform a process of tracking a pose based on a user model. When a confidence of a result of the tracking the pose fails to satisfy predetermined conditions, the apparatus for estimating the pose may repeat operations starting from performing the pose recognition with respect to a subsequent image frame. The apparatus for estimating the pose may perform the process of recognizing the pose based on the voxel reconstruction and the process of tracking the pose based on the user model exclusively of one another, and efficiently estimate unlearned poses and various postures. Hereinafter, the method for estimating the pose performed by the apparatus for estimating the pose will be described in detail.

In operation 110, the apparatus for estimating the pose may recognize a pose of a user from a depth image. The apparatus for estimating the pose may recognize the pose of the user from the depth image, using a classification tree. The apparatus for estimating the pose may use a single or a plurality of classification trees to recognize the pose of the user from the depth image. Through the use of training data, the apparatus for estimating the pose may learn the classification tree. The apparatus for estimating the pose may identify a user area displayed in the depth image. The user area may refer to an area occupied by a shape of the user in the depth image. The apparatus for estimating the pose may efficiently recognize the pose of the user corresponding to data learned via the classification tree.

For example, the apparatus for estimating the pose may generate a classification tree, using visible object part data and hidden object part data in a user area of a depth image. The visible object part data refers to a body part visible in the user area of the depth image, and the hidden object part data refers to a body part obscured by another body part or an object. The apparatus for estimating the pose may discern a probability of the visible object part data and a probability of the hidden object part data, using the classification tree. The apparatus for estimating the pose may consider the probability of the visible object part data and the probability of the hidden object part data in a single data space. The apparatus for estimating the pose may estimate a probability of body parts being visible in the user area and a probability of body parts being obscured in the user area, and may reconstruct the obscured body parts through the simultaneously learning of the visible object part data and the hidden object part data. The apparatus for estimating the pose may recognize the pose of the user by considering a result of the estimating and a result of the reconstructing in a single data space.

The apparatus for estimating the pose may recognize a body part of the user configuring the user area via the classification tree. As learning of the classification tree proceeds, and a level of the classification tree increases, a probability of a predetermined class may increase and a probability of other classes may decrease. When the learning proceeds up to a point of a leaf node of the classification tree, the probability of the visible object part data and the probability of the hidden object part data may be stored. When a point of the depth image passes through the classification tree to arrive at the leaf node, the apparatus for estimating the pose may recognize a body part of the user configuring the user area, based on the probability at the leaf node. For example, the apparatus for estimating the pose may determine a body part of the user to which a corresponding voxel belongs, based on an average value of posterior probabilities of a leaf node derived from a plurality of classification trees. The apparatus for estimating the pose may form a class with respect to the body part included in the user area, and calculate a probability of the body part included in the user area belonging to a predetermined class. The apparatus for estimating the pose may determine a class having a highest probability to be a corresponding body part.

In operation 120, the apparatus for estimating the pose may calculate a confidence of the result of the recognition in operation 110, and may determine whether the confidence of the result of the recognition satisfies predetermined conditions. For example, the apparatus for estimating the pose may compare the confidence of the result of the recognition to a predetermined threshold value, and when the confidence of the result of the recognition is greater than the predetermined threshold value, may determine that the predetermined conditions are satisfied. The apparatus for estimating the pose may determine a probability of a point or a pixel included in a depth image corresponding to a plurality of body parts, using the classification tree, and determine the confidence of the result of the recognition, based on the determined probability.

When the confidence of the result of the recognition satisfies the predetermined conditions, the apparatus for estimating the pose may estimate the pose of the user, based on the result of the recognition in operation 130. For example, the apparatus for estimating the pose may determine a pose representing the result of the recognition to be the pose of the user displayed in the depth image.

In operation 135, the apparatus for estimating the pose may determine whether a current depth image, or an image frame, is a final depth image, or a final image frame. When the current depth image is determined to be the final depth image, the apparatus for estimating the pose may end a process of estimating a pose. When the current depth image is determined not to be the final depth image, the apparatus for estimating the pose may repeat operation 110 for a subsequent depth image. For example, when all image frames satisfy conditions of operation 120, the apparatus for estimating the pose may recognize the pose of the user, using the classification tree with respect to all the image frames, and estimate the pose of the user, based on the result of the recognition.

When the confidence of the result of the recognition fails to satisfy the predetermined conditions, the apparatus for estimating the pose may track the pose of the user, using a user model. Here, the user model may include a plurality of body parts.

The apparatus for estimating the pose may generate the user model in real time from the user area displayed in the depth image. Through use of the user area and the result of the recognition of operation 110 the apparatus for estimating the pose may generate the user model corresponding to the user. The apparatus for estimating the pose may generate the user model in advance, based on the result of the recognition of operation 110, prior to performing operation 140. The result of the recognition may include information on body parts configuring the user area joint information indicating a joint of the user. The apparatus for estimating the pose may apply the joint information derived from the result of the recognition to a body part included in the user model.

The apparatus for estimating the pose may insert a joint, corresponding to a boundary of the body part, into all adjacent body parts, apply a kinematic chain, and connect all the adjacent body parts to one another, using the joint. For example, an elbow joint may be inserted in between an upper arm and a lower arm. As the body parts are connected using the joint, drift of a model generated by a swift motion of the user, self-occlusion of body parts, and the like, may be minimized. The drift of the model may refer to an instance of adjacent body parts to be spaced and detached from one another, or an instance in which a body part is erroneously connected to another body part to move. The apparatus for estimating the pose may generate the user model, by connecting the adjacent body parts to which the joint information is applied.

The apparatus for estimating the pose may perform random sampling on the user area in order to reduce a volume of data to be processed. The user model generated using the depth image and the result of the recognition may refer to a user model provided in a point cloud form, and the apparatus for estimating the pose may adjust a number of points configuring the user model through the random sampling to enhance a processing speed.

The apparatus for estimating the pose may merge body parts of the user derived from the result of the recognition into predetermined body parts. For example, the apparatus for estimating the pose may generate a user model in which a result of recognition, for example, 31 body parts, stored subsequent to an N number of image frames, where N may be set to various values, is merged into ten predetermined body parts. According to an example embodiment, ten body parts may be divided based on three levels as shown in Table 1 to apply forward kinematics.

TABLE 1

| Level | Body part |
|---|---|
| $0^{th}$ Level | Torso (T) |
| $1^{st}$ Level | Head-Neck (HN), Left Upper Arm (LUA), Right Upper Arm (RUA), Left Upper Leg (LUL), Right Upper Leg (RUL) |
| $2^{nd}$ Level | Left Lower Arm (LLA), Right Lower Arm (RLA), Left Lower Leg (LLL), Right Lower Leg (RLL) |

For example, when a number of joints derived from the result of the recognition of operation 110 is assumed to be 23, the 23 joints may be inserted into the ten body parts. A joint corresponding to a boundary of adjacent body parts may be inserted into all of the adjacent body parts.

The apparatus for estimating the pose may remove noise present in a depth image to generate a more precise user model. The apparatus for estimating the pose may remove noise by performing Gaussian clustering with respect to a body part of the user displayed in the depth image. For example, the apparatus for estimating the pose may remove noise, using a center position of the body part as shown in Equation 1 below.

$$F_{noise}(j) = \begin{cases} 1, & \text{If } |c_i - x_j| > 2.5\sigma_i \\ 0, & \text{otherwise} \end{cases}, \text{ where } i = 1, \ldots, 10 \text{ and } j = 1, \ldots, N_i, \qquad \text{[Equation 1]}$$

Here, "i" denotes an index of a body part, and "j" denotes an index of a point included in an i-th body part. "$N_i$" denotes a number of total points of the i-th body part. "i=1, . . . , 10" denotes "T, HN, LUA, LLA, RUA, RLA, LUL, LLL, RUL, RLL" as defined in Table 1 in a sequential order. "$c_i$" denotes a center coordinate of the i-th body part, and $\sigma_i$ denotes a standard deviation of the i-th body part. "$X_j$" denotes a coordinate of a j-th point. The apparatus for estimating the pose may remove noise with respect to a body part through eliminating a point satisfying $F_{noise}(j)=1$ in a corresponding body part.

The apparatus for estimating the pose may adjust a position of a user model, based on a difference between the center coordinate of the user model and a center coordinate of a user area. The apparatus for estimating the pose may reposition a user model used in a plurality of image frames to a position of the user area, using the difference between the center coordinate of the user model and the center coordinate of the user area.

According to another example embodiment, the apparatus for estimating the pose may select a user model to be used for estimating a pose from among a plurality of predetermined user models. The apparatus for estimating the pose may select a user model corresponding to a user from among the plurality of user models, based on a similarity between a user area displayed in a depth image and a plurality of predetermined user models. For example, the apparatus for estimating the pose may compare the similarity between three-dimensional (3D) user models representing 19 representative body forms and the user area displayed in the depth image, and may select a 3D user model having a highest similarity to be the user model corresponding to the user from among the 19 representative user models. The apparatus for estimating the pose may project a 3D user model into a two-dimensional (2D) image, and compare a similarity between the 2D image and the user area. The apparatus for estimating the pose may extract a candidate user model, based on a predetermined criterion from the plurality of predetermined user models, compare the similarity between the 2D image of the extracted candidate user model and the user area, and determine a user model having a highest similarity. For example, the apparatus for estimating the pose may extract candidate user models from the plurality of predetermined user models, based on user information, for example, a height, a body type, and the like, of the user, identified through the user area of the depth image, project the extracted candidate user models into a 2D image, and compare a similarity between the projected 2D image and the user area. Through use of user models having various body types the apparatus for estimating the pose may provide the method for estimating the pose suitable for various body types of the user.

The apparatus for estimating the pose may initialize a user model to be used for the process of estimating the pose of the user through applying the result of the recognition of the pose of the user to a pose of an initial user model. The apparatus for estimating the pose may reposition a position of the initial user model to a position of the result of the recognition of a previous image frame, using a difference between a center of body parts calculated from a pose of the initial user model and a center of body parts derived from the result of the recognition of the previous image frame. The apparatus for estimating the pose may initialize a user model more precisely, for example, using an iterative closest point (ICP) algorithm. The ICP algorithm may refer to an algorithm calculating a rotation (R) matrix and a translation (T) matrix for minimizing an error, based on combinations of input data and model data related to one another. The apparatus for estimating the pose may form a corresponding relationship between a joint inserted into the body parts of the user model and a joint derived from the result of the recognition of the previous image frame. The apparatus for estimating the pose may update the position of the body part, based on matrix information derived through the ICP algorithm using the corresponding relationship between such joints.

The apparatus for estimating the pose may perform tracking of a pose based on a user model, using a joint connection between adjacent body parts and an ICP algorithm. The apparatus for estimating the pose may predict a current position of a body part, using the ICP algorithm. The apparatus for estimating the pose may search for a corresponding relationship between a point included in a body part of a user model and a point included in a depth image, through applying the ICP algorithm to body parts, starting from a highest level of the body part. The apparatus for estimating the pose may calculate the R matrix and the T matrix, based on the found corresponding relationship, and update the user model through applying the calculated R matrix and the T matrix. The apparatus for estimating the pose may search for a corresponding relationship repeatedly, until a result of the updating satisfies predetermined conditions, and update the user model, using the R matrix and the T matrix. The apparatus for estimating the pose may apply a result of the updating to a body part of a lower level as well as a body part of a current level. The apparatus for estimating the pose may perform such operations from the body part of an upper level to the lower level. The apparatus for estimating the pose may generate a user model in which a pose of a user is tracked, through combining the updated body part of the current level with the body part of the upper level.

In operation 150, the apparatus for estimating the pose may calculate a confidence with respect to a result of the tracking of operation 140, and determine whether the confidence of the result of the tracking satisfies a predetermined condition or predetermined conditions. For example, the apparatus for estimating the pose may compare the confidence of the tracking to a predetermined threshold value, and when the confidence of the result of the tracking is greater than the predetermined threshold value, the predetermined condition or predetermined conditions are determined to be satisfied.

The confidence of the result of the tracking may be determined based on a similarity between the user area displayed in the depth image and the result of the tracking, and an average distance of points corresponding between the user model and the depth image. Hereinafter, the similarity between the user area and the result of the tracking may be referred to as "silhouette similarity". The confidence of the result of the tracking may be calculated using a weighted sum of the average distance of the points corresponding and the silhouette similarity. For example, the confidence of the result of the tracking may be determined based on Equation 2.

$$T_{Confidence} = C_T = C(D) \times C(S) \qquad \text{[Equation 2]}$$

Here, C(D) denotes a cost with respect to the average distance of the points corresponding, and C(S) denotes the silhouette similarity between the user area and the result of the tracking. For example, the apparatus for estimating the pose may determine that the confidence of the result of the tracking fails to satisfy the predetermined conditions when the confidence of the result of the tracking is less than the predetermined threshold value.

When an average distance value of points corresponding with respect to at least one body part is relatively great, a tracking failure is determined to occur in a corresponding image frame. For example, the apparatus for estimating the pose may select a greatest value from among average distance values of points corresponding to a body part included in a user model, and calculate a cost with respect to the average distance value of the points corresponding based on Equation 3.

$$C(D) = 1 - \max[(\bar{d}(T), \bar{d}(HN), \ldots, \bar{d}(RLL)] \qquad \text{[Equation 3]}$$

Here, $\bar{d}(\bullet)$ denotes an average distance of corresponding points normalized based on a setting in which a greatest distance of the corresponding points of a body part is set to be 30 centimeters (cm). $\bar{d}(\bullet)$ may be set to be "1" when the average distance of the corresponding points is greater than the greatest distance of the corresponding points. The greatest distance of the corresponding points may vary randomly. When the average distance value of the corresponding points with respect to the at least one body part is greater than the greatest distance of the corresponding points, C(D) may be "0".

The apparatus for estimating the pose may calculate the silhouette similarity C(S) between the user area and the result of the tracking, using F-measure based on "Recall" and "Precision". For example, the silhouette similarity C(S) may be determined based on Equation 4.

$$C(S) = \frac{2 \cdot \text{Recall} \cdot \text{Precision}}{\text{Recall} + \text{Precision}}, \qquad \text{[Equation 4]}$$

-continued where $$Recall = \frac{Card(M \cap D)}{Card(D)}$$

and $$Precision = \frac{Card(M \cap D)}{Card(M)}$$

Here, M denotes a resulting image in which a morphology operation is applied to a user model image generated by projecting a user model into a 2D image plane, and D denotes a depth image on which sampling is yet to be performed. Card(•) denotes a number of corresponding elements. The greater a match between M and D, the greater a value of C(S).

According to another example embodiment, the confidence of the result of the tracking may be determined based on a Hausdorff distance with respect to an edge pixel of M and D of Equation 4. A calculation speed may be improved through randomly sampling the edge pixel a predetermined number of times. When the Hausdorff distance with respect to the edge pixel is greater than the predetermined threshold value, the apparatus for estimating the pose may determine such a case to be a tracking failure.

When the confidence of the result of the tracking satisfies predetermined conditions, the apparatus for estimating the pose may estimate a pose of the user, based on the result of the tracking in operation 160. For example, the apparatus for estimating the pose may determine a pose represented by the result of the tracking to be a pose of the user displayed in the depth image.

In operation 165, the apparatus for estimating the pose may determine whether a current depth image is a final depth image. When the current depth image is determined to be the final depth image, the apparatus for estimating the pose may end a process of estimating the pose. When the current depth image is determined not to be the final depth image, the apparatus for estimating the pose may repeat operation 140 with respect to a subsequent depth image, for example, with respect to a next depth image among a quantity of consecutive depth images.

When the confidence of the result of the tracking fails to satisfy the predetermined conditions, the apparatus for estimating the pose may estimate the pose of the user with respect to a current image frame, based on the result of the recognition of operation 110 or the result of the tracking of operation 140. According to another example embodiment, the apparatus for estimating the pose may estimate the pose of the user using both the result of the recognition and the result of the tracking.

In operation 180, the apparatus for estimating the pose may determine whether the current depth image is the final depth image, and when the current depth image is determined to be the final depth image, end the process of estimating the pose. When the current depth image is determined not to be the final depth image, the apparatus for estimating the pose may repeat operation 110 with respect to a subsequent depth image. When the confidence of the result of the tracking fails to satisfy the predetermined conditions in operation 150, the apparatus for estimating the pose may repeat a process of recognizing the pose of the user, using the classification tree with respect to a subsequent image frame.

Figure 2:
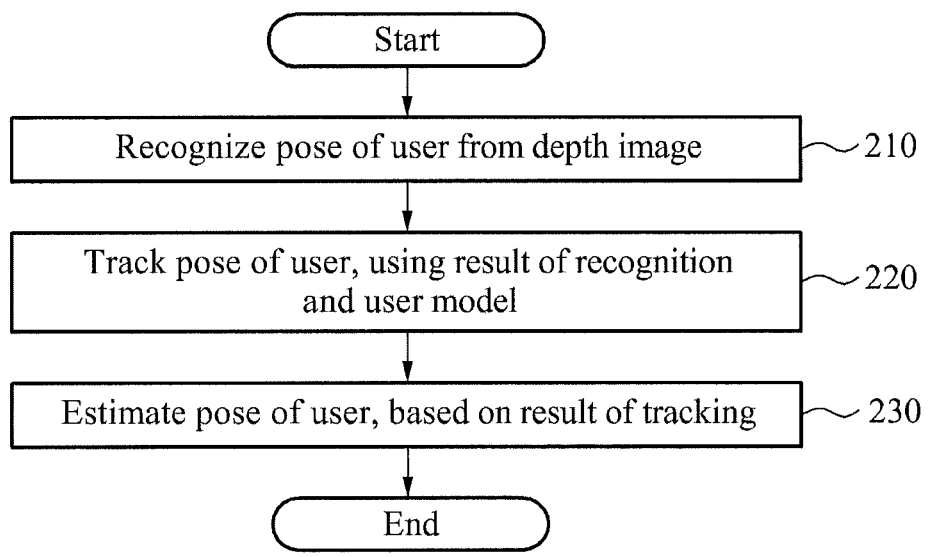
FIG. 2 illustrates a method for estimating a pose according to other example embodiments.

FIG. 2 illustrates a method for estimating a pose according to other example embodiments.

In operation 210, an apparatus for estimating a pose may recognize a pose of a user from a depth image, using a classification tree. The apparatus for estimating the pose may identify a torso area and a limb area from a user area of a depth image, using a learned classification tree. The limb area may refer to an area remaining subsequent to the excluding of the torso area from the user area. For any detailed descriptions of operation 210 omitted herein, reference may be made to analogous features of operation 110 of FIG. 1.

In operation 220, the apparatus for estimating the pose may track the pose of the user, using a result of the recognition and a user model. The apparatus for estimating the pose may divide the user area displayed in the depth image into the torso area and the limb area, based on the result of the recognition. When a body part included in the limb area is updated, using an ICP algorithm, the apparatus for estimating the pose may enhance a performance of the tracking, through eliminating a point identified to be the torso area from the user area of the depth image. The apparatus for estimating the pose may not use information associated with the torso area when the user model with respect to the limb area is updated. The apparatus for estimating the pose may conduct separate searches for a corresponding relationship with respect to the torso area and the limb area. For example, the apparatus for estimating the pose may generate two K-D trees (such as a torso tree and a limb tree) with respect to the torso area and the limb area, and search for the corresponding relationship only in a tree corresponding to a body part model. Transitively, the apparatus for estimating the pose may provide a method for estimating a pose that may endure a self-occlusion of body parts.

In operation 230, the apparatus for estimating the pose may estimate the pose of the user, based on the result of the tracking. The apparatus for estimating the pose may determine a pose represented by the result of the tracking to be the pose of the user displayed in the depth image.

Figure 3A:
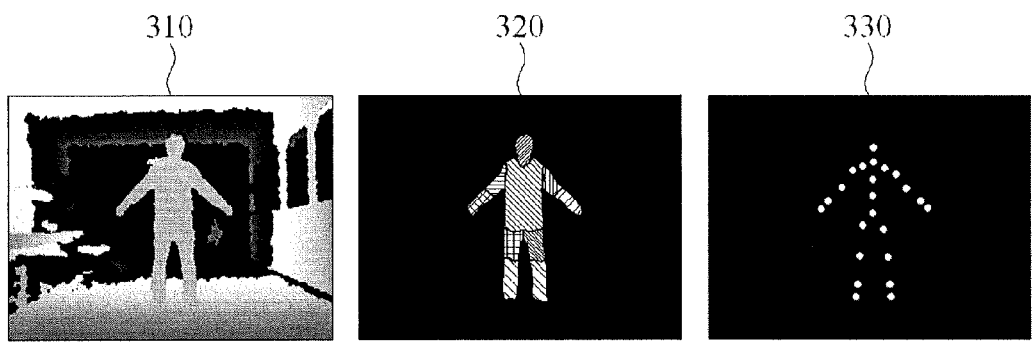
FIGS. 3A and 3B illustrate a process of generating a user model using a depth image according to example embodiments.
Figure 3B:
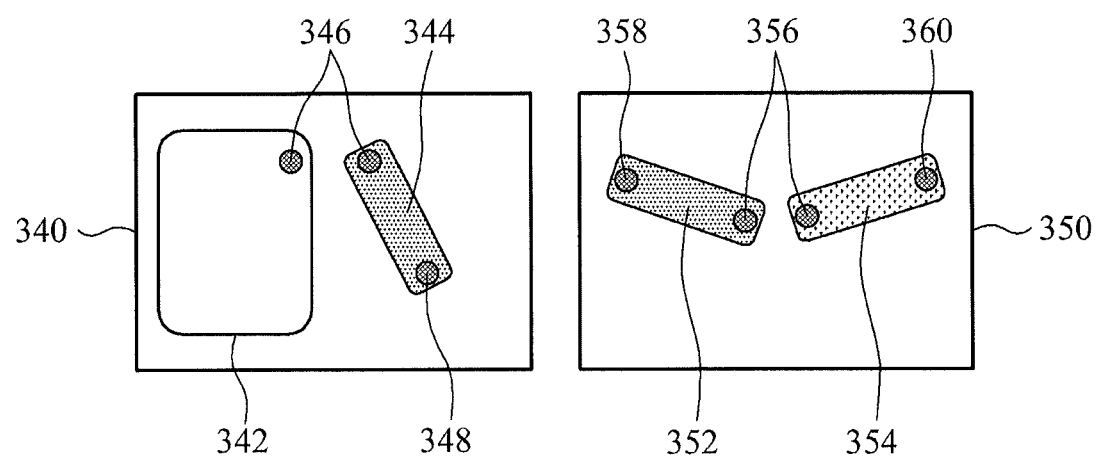

FIGS. 3A and 3B illustrate a process of generating a user model using a depth image according to example embodiments.

Referring to FIG. 3A, a depth image 310 including a form of a user, a user model 320 defined using ten body parts, and joint information 330 obtained from a result of recognition are illustrated. The joint information 330 may be inserted into the user model 320.

The user model 320 may refer to a user model in a point cloud form generated using depth information. A number of points of the user model 320 may be adjusted through random sampling. For example, when the number of points obtained through a depth sensor is assumed to be in an approximate range of 7000 to 8000 points, the apparatus for estimating the pose may generate a user model, using approximately 3000 points selected from the random sampling. A processing speed may be enhanced through the random sampling. A number of times that sampling is to be performed or a sampling rate may be predetermined.

FIG. 3B illustrates generating a user model through inserting a joint corresponding to a boundary of an adjacent body part into a plurality of body parts. In a process 340, which describes connecting a torso 342 and a left upper arm 344, the apparatus for estimating the pose may insert a plurality of joints 346 and 348 corresponding to the torso 342 and the left upper arm 344, respectively, for example. The apparatus for estimating the pose may insert a joint, for example, JOINT_LEFT_SHOULDER 346, disposed at a boundary of the torso 342 and the upper arm 344 into the torso 342 and the left upper arm 344 both. The apparatus for estimating the pose may insert a joint corresponding to a boundary of adjacent body parts into the plurality of body parts, apply a kinematic chain, and connect the adjacent body parts, using the joint.

For example, the apparatus for estimating the pose may calculate a difference between positions of JOINT_LEFT_SHOULDER 346 inserted into the torso 342 and the left upper arm 344 with respect to the left upper arm 344 as shown in Equation 5. The apparatus for estimating the pose may perform a process of repositioning a model point "$m_j$" corresponding to the left upper arm 344 to be joined to the torso 342, based on a result of Equation 5.

$$\tilde{m}_j^{LUA} = \tilde{m}_j^{LUA} + d(\text{JOINT\_LEFT\_SHOULDER}) \qquad \text{[Equation 5]}$$

Here, d(•) denotes an Euclidean distance between joints corresponding to the boundary of the adjacent body parts, for example, the joint 346 inserted into the torso 342 and the joint 346 inserted into the left upper arm 344. "j" denotes an index of a point included in a body part. The apparatus for estimating the pose may update the plurality of body parts, and reposition the positions of the body parts based on Equation 2. The apparatus for estimating the pose may enhance a performance of estimating the pose through connecting the body parts based on the joint, subsequent to updating the body parts.

Figure 4:
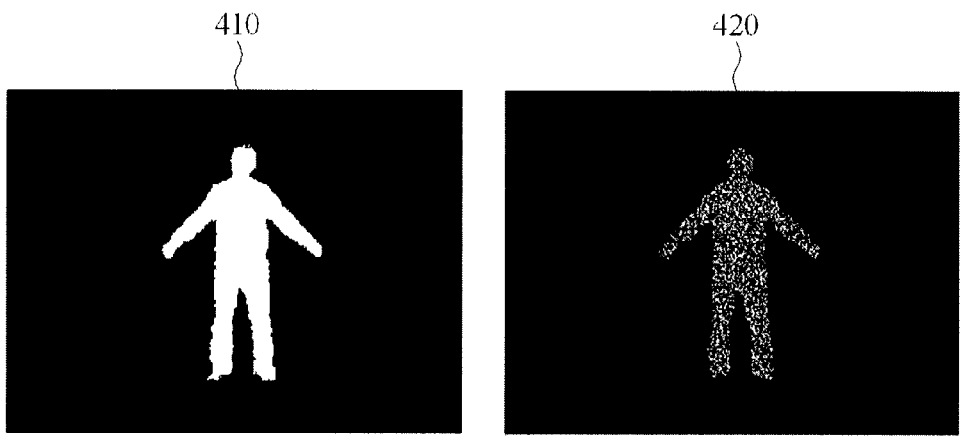
FIG. 4 illustrates depth images on which random sampling is performed according to example embodiments.

FIG. 4 illustrates depth images 410 and 420 on which random sampling is performed according to example embodiments.

Referring to FIG. 4, the depth image 410 on which random sampling is yet to be performed and the depth image 420 on which the random sampling has been performed are illustrated. An apparatus for estimating a pose may reduce a volume of data to be processed through performing the random sampling with respect to a user model and a depth image. The apparatus for estimating the pose may apply a morphology operation to a user model image generated by projecting the user model into a 2D image plane in order to calculate a degree of silhouette matching between the user model and a user area included in the depth image, and may generate a 2D depth image using all points on which the random sampling is yet to be performed. The generated 2D depth image may include a user model of which a silhouette is emphasized.

Figure 5:
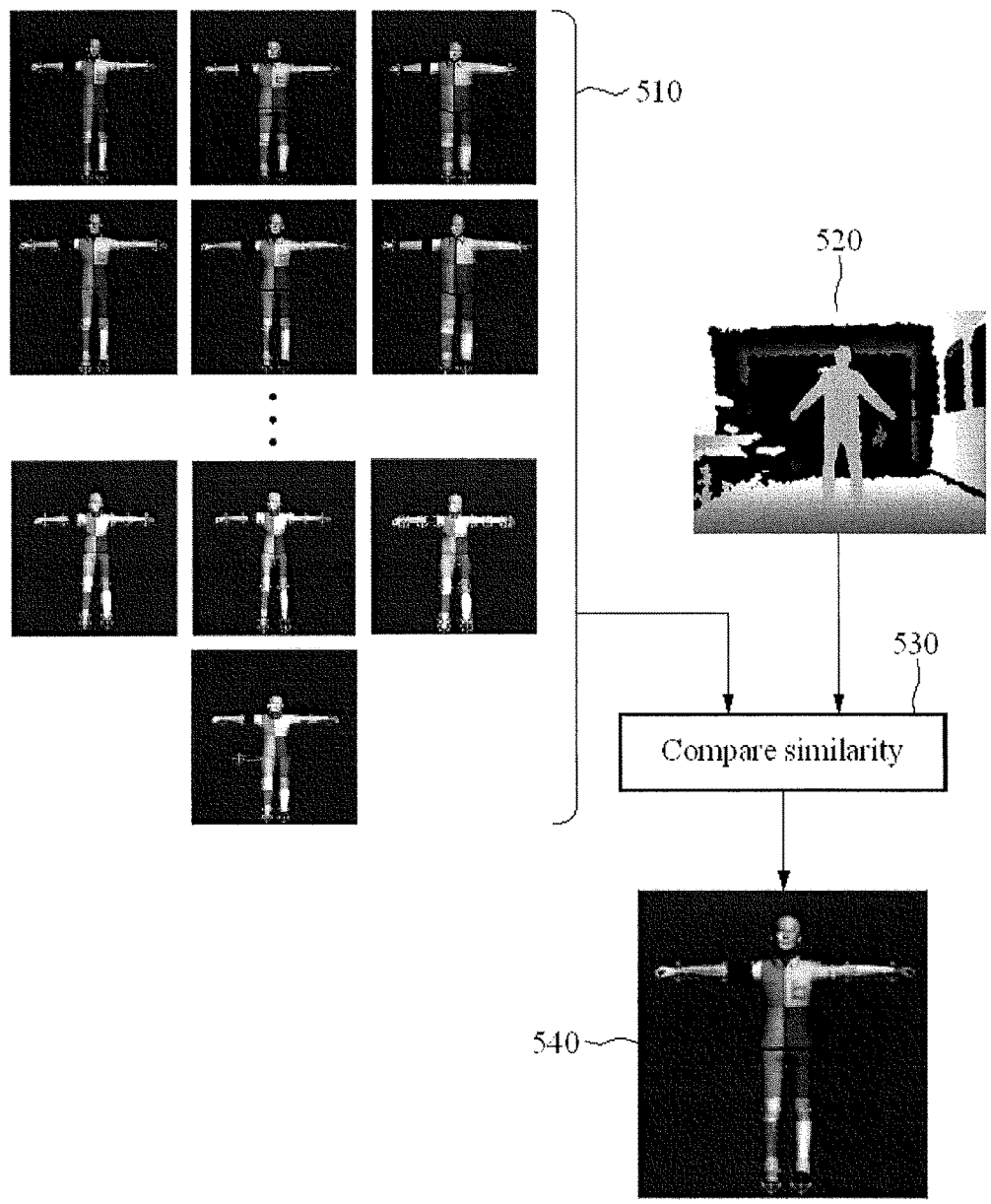
FIG. 5 illustrates a process of selecting a user model from among predetermined user models according to example embodiments.

FIG. 5 illustrates a process of selecting a user model from among predetermined user models according to example embodiments.

Referring to FIG. 5, the apparatus for estimating the pose may compare 530 a similarity between 3D user models 510 representing 19 representative body types, for example, male/female, tall/medium/short, obese/average/slim, children, and the like, and a user area displayed in the depth image 520. The apparatus for estimating the pose may select a 3D user model 540 most similar to the user area, and track the pose of the user, using the selected 3D user model 540.

According to another example embodiment, the apparatus for estimating the pose may extract a candidate user model, based on a predetermined criterion, from among predetermined user models, compare a similarity between a 2D image of the extracted candidate user model and the user area, and determine a user model having a highest similarity. For example, the apparatus for estimating the pose may use user information, such as a height, a body type, and the like, of the user identified from the user area in order to extract the candidate user model. The apparatus for estimating the pose may convert the extracted candidate user model into a 2D image, and compare a similarity between the converted 2D image and the user area.

Figure 6:
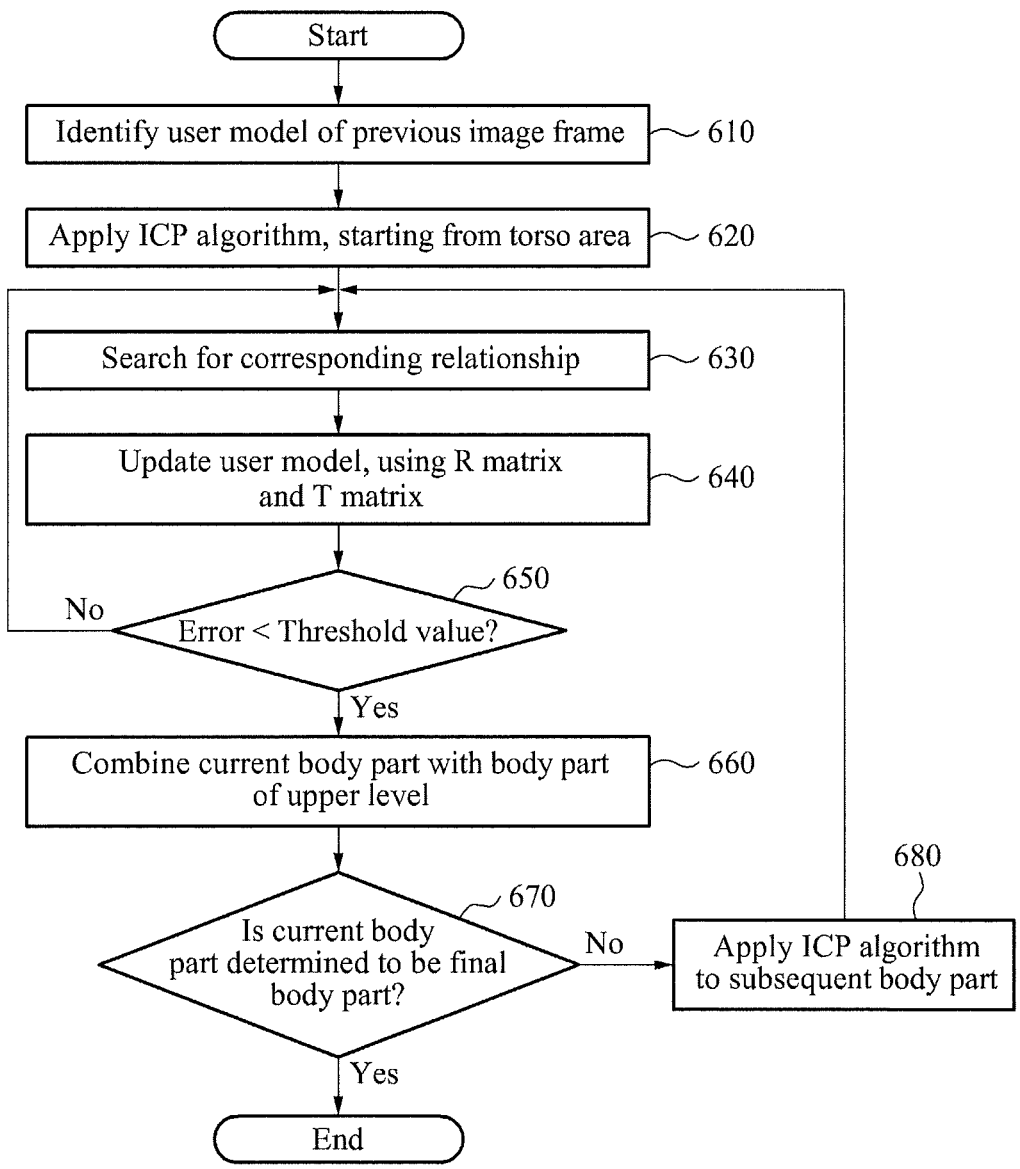
FIG. 6 illustrates a process of tracking a pose of a user according to example embodiments.

FIG. 6 illustrates a process of tracking a pose of a user according to example embodiments.

An apparatus for estimating a pose may perform tracking of a pose based on a user model, using a joint connection between adjacent body parts and an ICP algorithm. The apparatus for estimating the pose may predict a current position of a body part, using the ICP algorithm.

In operation 610, the apparatus for estimating the pose may identify a user model used in a previous image frame. In operation 620, the apparatus for estimating the pose may apply the ICP algorithm, starting from a highest level, for example, a torso area, as shown in Table 1 of FIG. 1. In operation 630, the apparatus for estimating the pose may set a corresponding relationship between a point included in a body part of the user model and a point included in a depth image, and search for the corresponding relationship. The apparatus for estimating the pose may search for the corresponding relationship, starting from the torso area of $0^{th}$ level, to apply forward kinematics. In operation 640, the apparatus for estimating the pose may calculate an R matrix and a T matrix, based on the found corresponding relationship, and update the user model, using the R matrix and the T matrix. For example, the apparatus for estimating the pose may calculate the R matrix and the T matrix, using a singular value decomposition (SVD), quaternions, an orthonormal matrix, and the like. The apparatus for estimating the pose may apply the R matrix and the T matrix to all body parts in the user model, and update the position of the body parts.

In operation 650, the apparatus for estimating the pose may calculate an error between a result of the updating using the R matrix and the T matrix and the user area included in the depth image, and compare the error to a predetermined threshold value. When the error is not less than the predetermined threshold value, the apparatus for estimating the pose may re-search for a corresponding relationship, based on the updated user model, calculate the R matrix and the T matrix, and repeat the updating of the user model.

When the error is less than the predetermined threshold value, the apparatus for estimating the pose may combine a current body part of the user model with a body part of an upper level in operation 660. The apparatus for estimating the pose may connect adjacent body parts, based on a joint inserted in a body part.

In operation 670, the apparatus for estimating the pose may determine whether the current body part is a final body part. When the current body part is determined to be the final body part, the apparatus for estimating the pose may terminate the process of tracking the pose. When the process of the tracking is completed, the user model of which body parts are updated based on the user area of the depth image may be generated.

When the current body part is determined not to be the final body part, the apparatus for estimating the pose may apply the ICP algorithm with respect to a body part of a subsequent level in operation 680. The apparatus for estimating the pose may search for a corresponding relationship with respect to the body part of the subsequent level, update the user model using the R matrix and the T matrix, and perform a process of combining a body part of the current level with the body part of the upper level.

The apparatus for estimating the pose may search for a corresponding relationship with respect to the torso area of $0^{th}$ level, and when a position of body parts of a lower level, for example, $1^{st}$ level and $2^{nd}$ level, is updated, based on the R matrix and the T matrix, the apparatus for estimating the pose may search for a corresponding relationship with respect to a body part of $1^{st}$ level, using the same scheme, and update a position of a body part of a current level, for example, $1^{st}$ level, and a position of a body part of a lower level, for example, $2^{nd}$ level, based on the R matrix and the T matrix. By way of example, when the R matrix and the T matrix are calculated with respect to Left_Upper_Arm, for example, $1^{st}$ level, the apparatus for estimating the pose may apply a result of the calculation to Left_Lower_Arm, for example, $2^{nd}$ level, and update the position of the body parts of the lower level as well as the current level. The apparatus for estimating the pose may calculate the R matrix and the T matrix with respect to the body part of $2^{nd}$ level, and update a position of a corresponding body part. When the updating of the body part of $2^{nd}$ level is completed, the apparatus for estimating the pose may combine the body part of $2^{nd}$ level with an adjacent body part of the upper level, for example, $1^{st}$ level. The apparatus for estimating the pose may use a K-D tree, and the like, to enhance a processing speed in a process of searching for the corresponding relationship.

Figure 7:
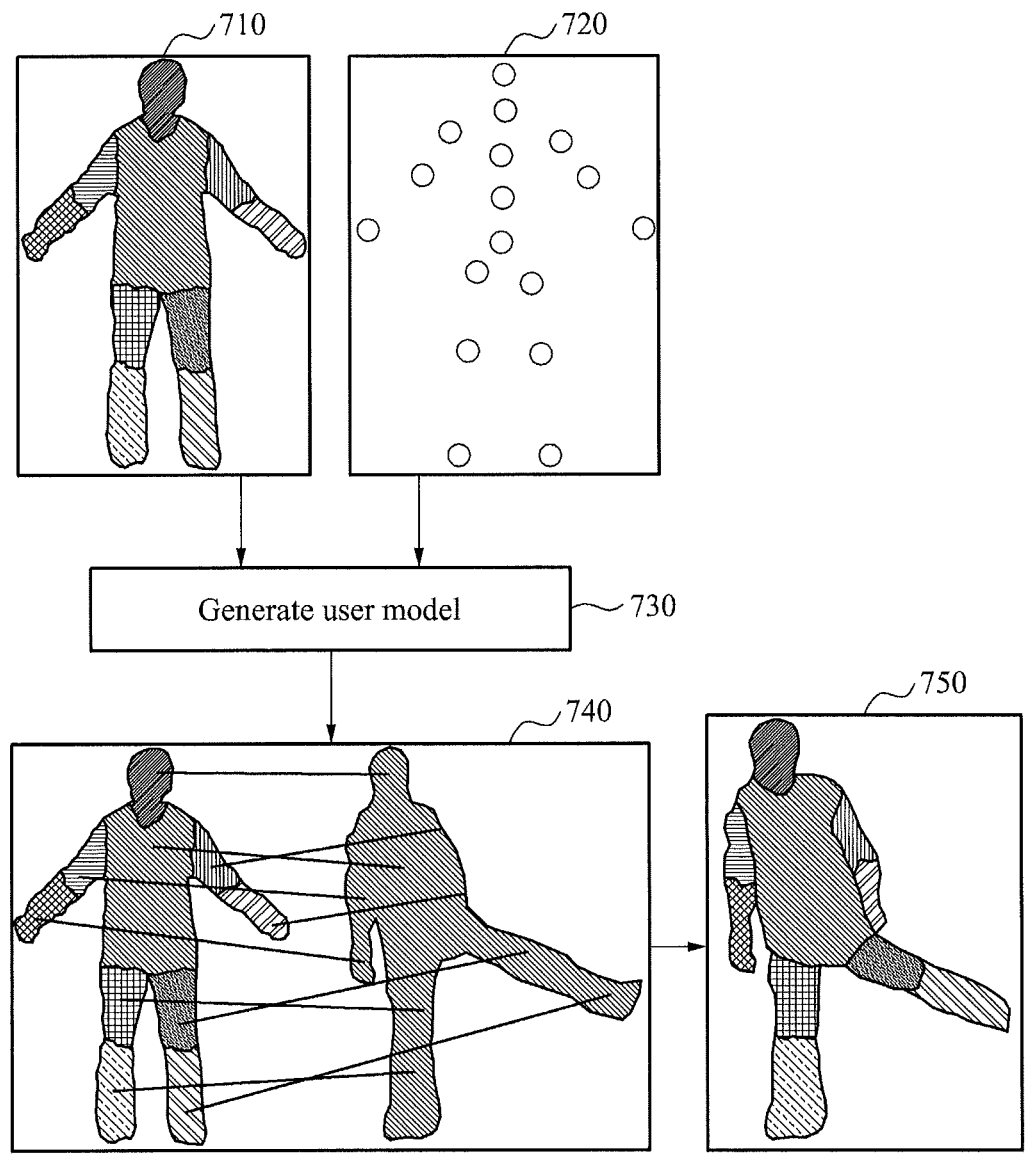
FIG. 7 illustrates a process of tracking a pose of a user according to example embodiments.

FIG. 7 illustrates a process of tracking a pose of a user according to example embodiments.

Referring to FIG. 7, an apparatus for estimating a pose may generate 730 a user model, using a user area 710 of a depth image, and joint information 720 derived from a result of recognition using a classification tree. Body parts may be identified from the user area 710, using the classification tree. The apparatus for estimating the pose may search for a corresponding relationship 740 between a point included in the user model and a point included in the user area 710 of the depth image, and calculate an R matrix and a T matrix with respect to a plurality of body parts based on the found corresponding relationship. The apparatus for estimating the pose may update 750 the user model, based on the R matrix and the T matrix. For any descriptions omitted in FIG. 7 herein, reference may be made to analogous features described in FIG. 6.

FIG. 8 illustrates a result 810 of recognizing a pose of a user using a classification tree, and a result 820 of tracking a pose of a user using a user model according to example embodiments.

Referring to FIG. 8, the result 810 of recognizing of the pose of the user using the classification tree and the result 820 of tracking of the pose of the user using the user model are illustrated. To estimate the pose of the user, an apparatus for estimating a pose may efficiently estimate an unlearned pose, using the result 810 of recognition and the result 820 of tracking complementarily, and enhance precision with respect to the estimating of the pose.

Figure 9:
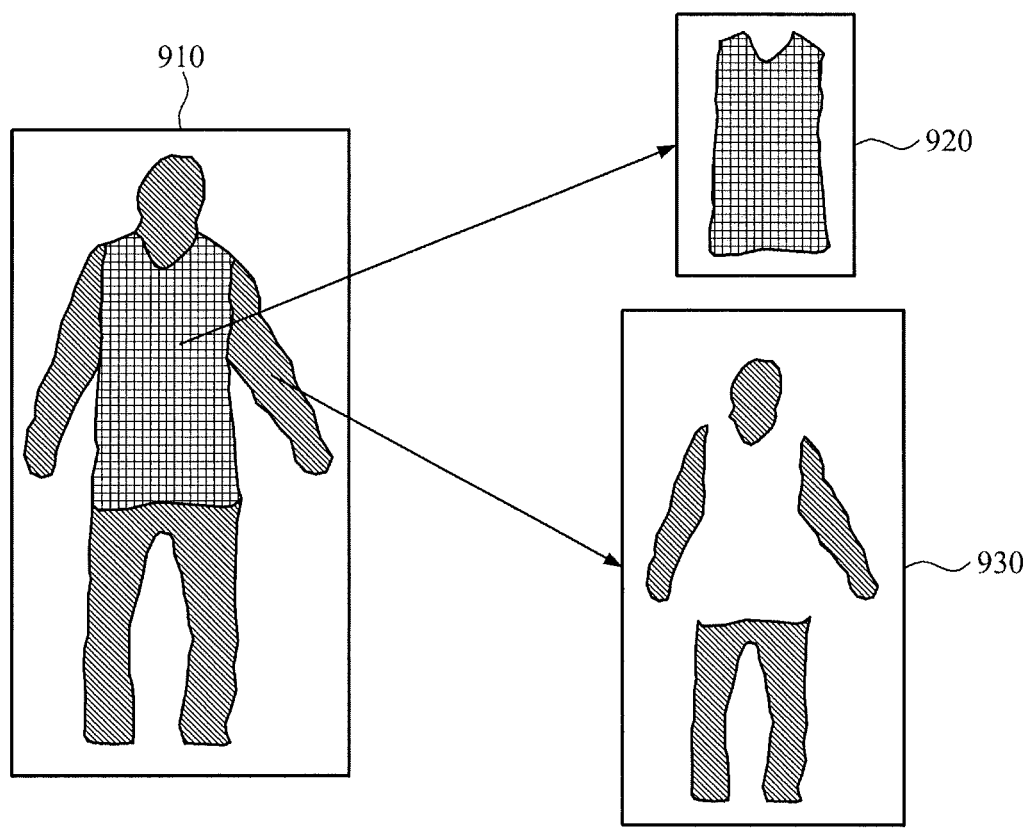
FIG. 9 illustrates a process of tracking a pose of a user, based on a torso area and a limb area according to example embodiments.

FIG. 9 illustrates a process of tracking a pose of a user, based on a torso area 920 and a limb area 930 according to example embodiments.

In particular, FIG. 9 illustrates the process of tracking the pose of the user, using a result of recognizing the torso area 920. An apparatus for estimating a pose may perform recognition of a pose of a user using a classification tree, and perform recognition of a pose of a user using a user model both, for a plurality of image frames. The apparatus for estimating the pose may track the pose of the user through updating the user model, based on the result of the recognition of the torso area 920 included in a user area 910 based on the result of the recognition of the pose and a corresponding relationship.

The apparatus for estimating the pose may divide the user area 910 into the torso area 920 and the limb area 930. The limb area 930 may correspond to an area remaining subsequent to excluding the torso area 920 from the user area 910. A tracking failure may occur due to self-occlusion generated in the torso area 920. When a body part included in the limb area 930 is updated using an ICP algorithm, the apparatus for estimating the pose may enhance a performance of estimating the pose through eliminating a point identified to be the torso area 930 from the user area 910 of the depth image. For example, the apparatus for estimating the pose may generate two K-D trees with respect to the torso area 920 and the limb area 930, and enhance the performance of estimating the pose through searching for the corresponding relationship only in a tree corresponding to a body part model.

Figure 10:
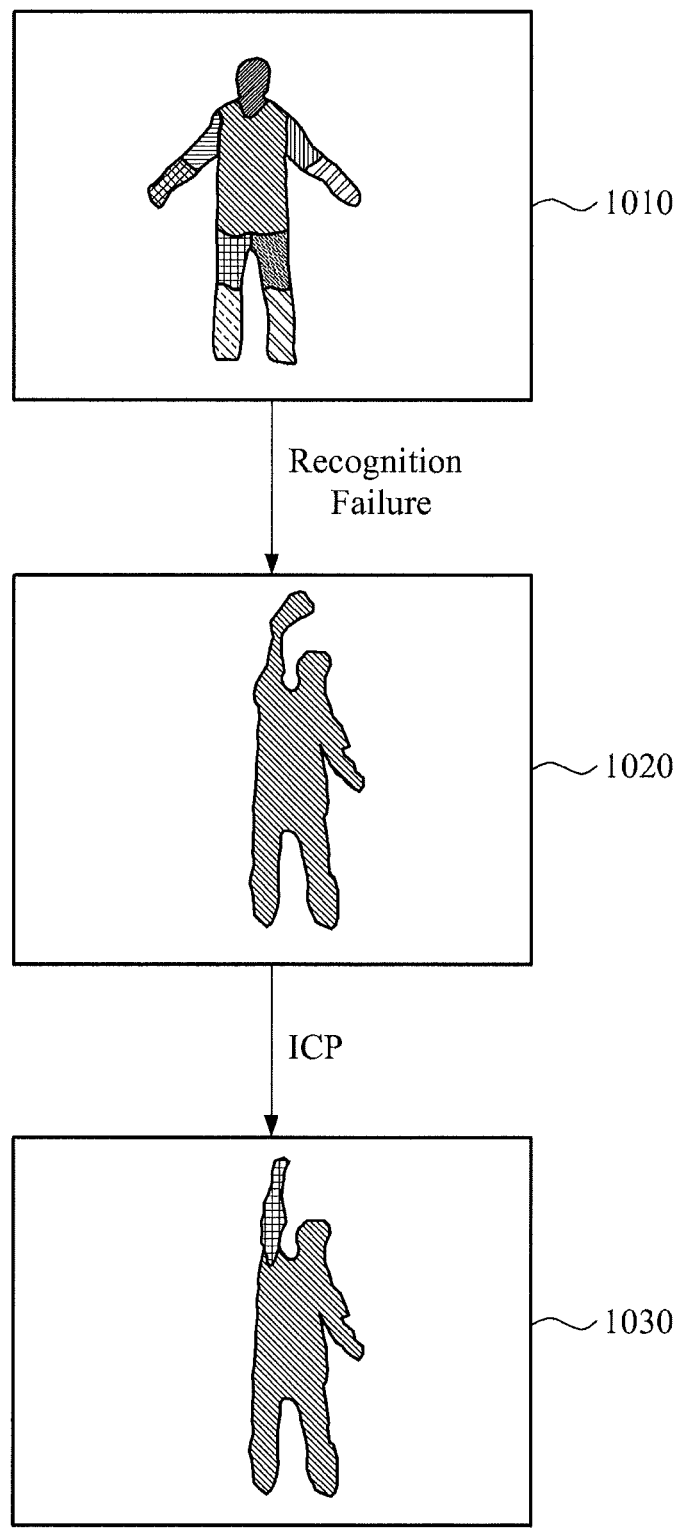
FIG. 10 illustrates a process of initializing a user model, based on a result of a recognition unit according to example embodiments.

FIG. 10 illustrates a process of initializing a user model, based on a result of a recognition unit according to example embodiments.

An apparatus for estimating a pose may perform a process of tracking a pose of a user, using a user model when a confidence with respect to a result of the recognizing of the pose of the user using a classification tree fails to satisfy predetermined conditions, for example, in an instance of a recognition failure. The apparatus for estimating the pose may track the pose of the user, using the user model, subsequent to initializing the user model, using the result of recognizing the pose of the user and an ICP algorithm.

The apparatus for estimating the pose may apply the result of recognizing the pose of the user to a pose 1010 of an initial user model, and may initialize the user model to be used in the process of tracking the pose of the user. The apparatus for estimating the pose may reposition 1020 a position of the initial user model to a position of the result of recognizing a previous image frame, using a difference between a center of body parts calculated in the pose 1010 of the initial user model and a center of body parts derived from the result of recognizing the previous image frame.

The apparatus for estimating the pose may initialize 1030 more precisely the position of the user model, using the ICP algorithm based on a corresponding relationship between joints. The apparatus for estimating the pose may prevent a body part from being repositioned differently from an actual position, using the ICP algorithm based on the corresponding relationship between the joints. The apparatus for estimating the pose may form a corresponding relationship between a joint inserted into body parts in the user model and a joint derived from the result of recognizing the previous image frame. The apparatus for estimating the pose may calculate an R matrix and a T matrix through performing the ICP algorithm, based on the corresponding relationship between the joints, and update a position of a corresponding body part through applying the calculated R matrix and the T matrix to all points included in the corresponding body part. Transitively, the apparatus for estimating the pose may initialize the position of body parts in the user model. The apparatus for estimating the pose may promptly perform the ICP algorithm without further searching for a corresponding relationship, using the joint information inserted into the body part of the user model and the joint information derived from the result of recognition.

Figure 11:
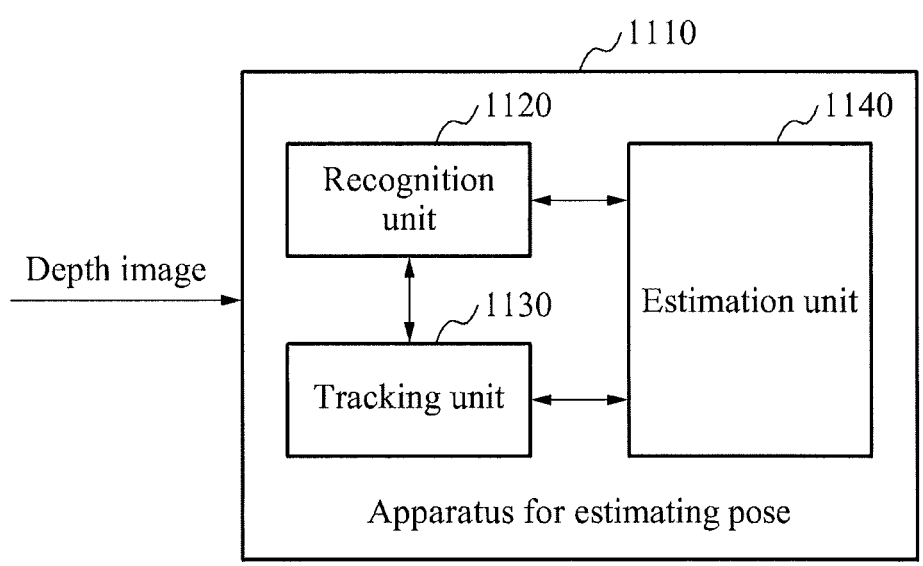
FIG. 11 illustrates a configuration of an apparatus for estimating a pose according to example embodiments.

FIG. 11 illustrates a configuration of an apparatus 1110 for estimating a pose according to example embodiments.

Referring the FIG. 11, the apparatus 1110 for estimating the pose may include, for example, a recognition unit 1120, a tracking unit 1130, and an estimation unit 1140.

The recognition unit 1120 may recognize a pose of a user from a depth image. The recognition unit 1120 may recognize the pose of the user from the depth image, using a single or a plurality of classification trees. The recognition unit 1120 may learn the classification tree using training data, and identify a user area displayed in the depth image. For example, the recognition unit 1120 may generate a classification tree, using visible object part data and hidden object part data in the user area of the depth image. The recognition unit 1120 may discern a probability of a corresponding input point belonging to the visible object part data and a probability of the corresponding input point belonging to the hidden object part data using the classification tree. The recognition unit 1120 may consider the probability of the visible object part data and the probability of hidden object part data in a single data space. The recognition unit 1120 may estimate a probability of body parts being visible and a probability of body parts being obscured in the user area, and may reconstruct the obscured body parts, through simultaneously learning the visible object part data and the hidden object part data. The recognition unit 1120 may recognize the pose of the user, through configuring a result of the estimation and a result of the reconstruction in a single data space.

The recognition unit 1120 may recognize a body part of the user configuring the user area via the classification tree. Learning about the classification tree may proceed, and a probability of a predetermined class may be maintained to be high and a probability of other classes may decrease as a level of the classification tree increases. The recognition unit 1120 may form a class with respect to the body part of the user, and calculate the probability of the body part included in the user area to belong to the predetermined class. The recognition unit 1120 may determine a class having a highest probability to be a corresponding body part.

The tracking unit 1130 may track the pose of the user, using the user model. The user model may be generated based on the user area displayed in the depth image and a result of recognition of the recognition unit 1120. A joint may be inserted into a body part included in the user model, and the user model may be generated through adjacent body parts being connected based on the joint, subsequent to application of a kinematic chain. According to another example embodiment, the tracking unit 1130 may select the user model corresponding to the user from among a plurality of predetermined user models, based on a similarity between the user area displayed in the depth image and the predetermined plurality of user models.

The tracking unit 1130 may initialize the user model to be used in a process of tracking the pose of the user through applying the result of the recognizing the pose of the user to the pose of the initial user model. The tracking unit 1130 may perform tracking of a pose based on the user model, using a joint connection between adjacent body parts and an ICP algorithm. The tracking unit 1130 may predict a current position of a body part, using the ICP algorithm. The tracking unit 1130 may apply the ICP algorithm, starting from a highest level of a body part, and search for a corresponding relationship between a point included in a body part of the user model and a point included in the depth image. The tracking unit 1130 may calculate an R matrix and a T matrix, based on the found corresponding relationship, and update the user model through applying the calculated R matrix and the T matrix to the user model. The tracking unit 1130 may continuously search for the corresponding relationship, and update the user model, using the T matrix until a result of the updating satisfies predetermined conditions. The tracking unit 1130 may apply the result of the updating to a body part of a lower level as well as the body part of the current level. The tracking unit 1130 may combine the updated body part of the current level to the body part of the upper level, and generate the user model in which the pose of the user is reflected.

The tracking unit 1130 may divide the user area displayed in the depth image into the torso area and the limb area, based on the result of the recognition, and track the pose of the user, based on the torso area and the limb area. When the body part included in the limb area is updated using the ICP algorithm, the tracking unit 1130 may eliminate a point identified to be the torso area from the user area of the depth image.

The estimation unit 1140 may estimate the pose of the user, using the result of the recognition of the recognition unit 1120 and the result of the tracking of the tracking unit 1130 exclusively of one another. For example, the estimation unit 1140 may control the recognition unit 1120 and the tracking unit 1130 to operate exclusively of one another, based on a confidence with respect to the result of the recognition of the recognition unit 1120 and a confidence with respect to the result of the tracking of the tracking unit 1130. The estimation unit 1140 may determine whether to use the result of the recognition of the recognition unit 1120 or the result of the tracking of the tracking unit 1130 in an image frame unit, and based on a result of the determination, estimate the pose of the user. The estimation unit 1140 may determine a probability of a point included in the depth image to correspond to a plurality of body parts using a classification tree, and based on the determined probability, determine a confidence of the result of the recognition. When the confidence with respect to the result of the recognition fails to satisfy predetermined conditions, for example, when the confidence of the result of the recognition is less than a predetermined threshold value, the estimation unit 1140 may control the tracking unit 1130 to perform a process of tracking of the pose of the user. When the confidence with respect to the result of the tracking of the tracking unit 1130 fails to satisfy the predetermined conditions the estimation unit 1140 may estimate the pose of the user, based on the result of the recognition of the recognition unit 1120, or the result of the tracking of the tracking unit 1130. The confidence with respect to the result of the tracking of the tracking unit 1130 may be determined based on a similarity between the user area displayed in the depth image and the result of the tracking and an average distance of points corresponding between the user model and the depth image.

When the confidence with respect to the result of the recognition of the recognition unit 1120 and the confidence with respect to the result of the tracking of the tracking unit 1130 fail to satisfy the predetermined conditions, the estimation unit 1140 may estimate a pose of the user, based on at least one of the result of the recognition of the recognition unit 1120 and an output of an output unit. When the confidence with respect to the result of the tracking of the tracking unit 1130 fails to satisfy the predetermined conditions, the estimation unit 1140 may control a subsequent image frame to estimate the pose of the user, using the classification tree.

A portable device as used throughout the present specification may include without limitation mobile communication devices, such as a personal digital cellular (PDC) phone, a personal communication service (PCS) phone, a personal handy-phone system (PHS) phone, a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (for example, a global positioning system), and the like. Also, the portable device as used throughout the present specification includes a digital camera, a plasma display panel, and the like.

The method for estimating the pose according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the apparatus for estimating a pose described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method for pose estimating, the method comprising:
   recognizing, by way of a processor, a pose of a user from a depth image by classifying a body part of the user from the depth image by respectively determining probabilities for visible body parts and probabilities for hidden body parts using a classification tree;
   estimating the pose of the user based on a result of the recognition of the pose;
   recognizing a next pose of the user from a subsequent depth image when a confidence of the result of the recognizing of the pose satisfies a predetermined condition;
   tracking the pose of the user, using a user model when the confidence of the result of the recognizing of the pose fails to satisfy the predetermined condition; and
   estimating the pose of the user based on a result of the tracking,
   wherein the user model corresponding to the recognition of the pose is selected from a plurality of candidate kinematic models,
   wherein the tracking includes initializing the user model using body parts derived from result of recognition of previous depth image.

2. The method of claim 1, further comprising:
   continuing the tracking of the pose of the user with respect to a second subsequent depth image using the user model when the confidence of the result of the tracking of the pose satisfies a second predetermined condition, while otherwise re-performing the recognizing of the pose of the user from the second subsequent depth image.

3. The method of claim 1, further comprising:
   generating the user model corresponding to a user, based on a user area displayed in the depth image and the result of the recognition of the pose.

4. The method of claim 3, wherein the generating of the user model comprises:
   applying joint information derived from the result of the recognition of the pose to a body part included in the user model; and
   generating the user model through connecting adjacent body parts to which the joint information is applied.

5. The method of claim 3, wherein the generating of the user model comprises:
   randomly sampling a user area displayed in the depth image; and
   merging body parts of the user derived from the result of the recognition of the pose into predetermined body parts.

6. The method of claim 1, further comprising:
   selecting a user model corresponding to the user from among a plurality of predetermined user models, based on a similarity between a user area displayed in the depth image and the plurality of predetermined user models.

7. The method of claim 6, wherein the selecting of the user model corresponding to the user further comprises:
   extracting candidate user models from among the plurality of predetermined user models based on user information identified through the user area; and
   selecting, to be the user model corresponding to the user, a candidate user model having a highest similarity between the extracted candidate user models and the user area.

8. The method of claim 1, wherein the tracking of the pose of the user comprises:
   searching for a corresponding relationship between a point included in body parts of the user model and a point included in a depth image;
   determining a rotation matrix and a translation matrix, based on the corresponding relationship; and
   updating the user model, using the rotation matrix and the translation matrix.

9. The method of claim 8, wherein the updating of the user model comprises:
   updating the user model by applying a result of updating of a body part of an upper level from among the body parts included in the user model to a body part of a lower level.

10. The method of claim 1, wherein the confidence of the result of the tracking is determined based on a similarity between a user area displayed in the depth image and the result of the tracking and an average distance of points corresponding between a user model and a depth image.

11. The method of claim 1, wherein the tracking of the pose of the user comprises:
adjusting a position of a user model, based on a difference between a center coordinate of the user model and a center coordinate of the user area displayed in the depth image.

12. The method of claim 1:
wherein the initializing the user model includes applying the result of the recognition of the pose to the user model.

13. The method of claim 12, wherein the initializing of the user model comprises:
updating a position of a body part, based on a corresponding relationship between a joint inserted into a body part in the user model and a joint derived from the result of the recognition of the pose.

14. The method of claim 1, wherein each of plural nodes of the classification tree include separate information on a visible body part and information on a hidden body part, such that the probabilities for visible body parts are determined using information on a visible body part of a node of the classification tree and the probabilities for hidden body parts are determined using information on a hidden body part of the node of the classification tree.

15. The method of claim 1, wherein, in the recognizing of the pose of the user, a classification of a body part includes combined respective considerations of visible probabilities and hidden probabilities from plural classification trees.

16. The method of claim 1,
wherein the user model is a determined user kinematic model to track body parts, including body parts that are occluded in the depth image, selected from plural different body type candidate user kinematic models, and
wherein tracking of the pose includes initializing the determined user kinematic model by updating the determined user kinematic model using merged different body parts recognized in at least one previous recognizing of a pose of the user from a previous depth image using the classification tree.

17. The method of claim 16, wherein the initializing of the determined kinematic model further includes updating centers of body parts of the determined user kinematic model based on to determined centers of body parts derived from the at least one previous recognizing of the pose of the user from the previous depth image.

18. A hybrid pose recognition and tracking method comprising:
recognizing, by way of a processor, a pose of a user from a depth by classifying a body part of the user from the depth image by respectively determining probabilities for visible body parts and probabilities for hidden body parts using a classification tree;
estimating the pose of the user, based on a result of the recognizing of the pose; and
tracking the pose of the user in a subsequent depth image using a user model when a confidence of a result of the recognizing of the pose of the user fails to satisfy a predetermined condition,
wherein the user model corresponding to the recognition of the pose is selected from a plurality of candidate kinematic models,
wherein the tracking includes initializing the user model using body parts derived from result of recognition of previous depth image.

19. The hybrid pose recognition and tracking method of claim 18, wherein the user model selected from among the plurality of candidate kinematic models is selected based on a similarity between a user area displayed in the depth image and the selected user model.

20. A hybrid pose recognition and tracking method comprising:
recognizing, by way of a processor, a pose of a user from a depth image;
estimating the pose of the user, based on a result of the recognizing; and
tracking the pose of the user in a subsequent depth image using a user model when a confidence of a result of the recognizing of the pose of the user fails to satisfy a predetermined condition,
wherein the pose of the user is recognized using a classification tree,
wherein the user model corresponding to the recognition of the pose is selected from a plurality of candidate kinematic models,
wherein the tracking includes initializing the user model using body parts derived from result of recognition of previous depth image.

21. An apparatus for estimating a pose, the apparatus comprising:
a processor configured to:
recognize a pose of a user from a depth image by classifying a body part of the user from the depth image by respectively determining probabilities for visible body parts and probabilities for hidden body parts using a classification tree;
track a pose of a user, using a user; and
estimate a pose of a user, using at least one of a result of the recognition and a result of the tracking,
wherein the user model corresponding to the recognition of the pose is selected from a plurality of candidate kinematic models,
wherein the tracker is configured to initialize the user model using body parts derived from result of recognition of previous depth image.

22. The method of claim 21, wherein the processor is configured to control the recognizer and the tracker to operate exclusively of one another, based on a confidence with respect to the result of the recognizing of the recognizer and a confidence with respect to the result of the tracking of the tracker.

23. The method of claim 22, wherein the processor is configured to estimate the pose of the user based on the result of the tracking of the tracker when the confidence with respect to the result of the recognizing of the recognizer fails to satisfy a predetermined condition.

24. The method of claim 21, wherein the processor is configured to divide a user area displayed in the depth image into a torso area and a limb area, based on the result of the recognizing of the recognizer, and is configured to track a pose of a user, respectively based on the torso area and based on the limb area, and
the processor is configured to estimate the pose of a user, based on the result of the tracking.

25. The method of claim 24, wherein the estimator performs separate searches for correspondence between points included in the depth image and points included in body parts of the user model selectively
without using one or more points determined to correspond to the torso area, and
with using the one or more points determined to correspond to the torso area.

26. A hybrid pose recognition and tracking method comprising:
- recognizing, by way of a processor, a pose of a user from a depth image by classifying a body part of the user from the depth image by respectively determining probabilities for visible body parts and probabilities for hidden body parts using a classification tree;
- estimating the pose of the user, based on a result of the recognizing; and
- recognizing the pose of the user from a first subsequent depth image when a confidence of a result of the recognizing satisfies a predetermined condition;
- tracking the pose of the user in the subsequent depth image using a user model when the confidence of the result of the recognizing fails to satisfy the predetermined condition; and
- re-performing the recognizing the pose of the user from a second subsequent depth image when a confidence result of the tracking of the pose of the user in the subsequent depth image fails to satisfy a second predetermined condition,
- wherein the user model corresponding to the recognition of the pose is selected from a plurality of candidate kinematic models,
- wherein the tracking includes initializing the user model using body parts derived from result of recognition of previous depth image.

* * * * *